United States Patent Office 3,427,248
Patented Feb. 11, 1969

3,427,248
DETERGENT
Vincent Lamberti, Upper Saddle River, and Henry Lemair, Leonia, N.J., assignors to Lever Brothers Company, New York, N.Y., a corporation of Maine
No Drawing. Filed Oct. 22, 1965, Ser. No. 502,299
U.S. Cl. 252—117    7 Claims
Int. Cl. C11d 9/32, 9/30, 9/02

ABSTRACT OF THE DISCLOSURE

The specification is concerned with certain polyolethers, polyolpolyethers or sulfur analogs thereof which can be used alone as a detergent or in combination with other compounds.

---

This invention relates to a detergent. More particularly, it is concerned with a detergent which is a polyolether, polyolpolyether or sulfur analog thereof.

In the past, a straight chain or branched chain alcohol may be reacted with ethylene oxide to form ethoxylates, such as n-tetradecyl alcohol-7 moles ethylene oxide, dodecyl alcohol-10 moles ethylene oxide and Sterox AJ (tridecyl alcohol-about 9.5 moles ethylene oxide). These ethoxylates have detergent properties.

It has now been discovered that certain polyolethers and polyolpolyethers and thioether analogs are surface active agents, e.g., detergent actives, dishwashing detergents, lime-soap dispersants and suds-boosters for other detergent actives. The compounds of the invention also have antimicrobial activity and are nontoxic, mild towards skin and completely biodegradable.

method, the compounds of the invention are the reaction products of:

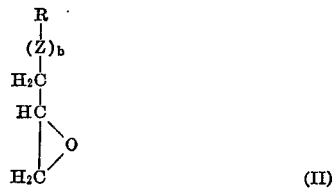

with:

$$HZ-(CH_2)_aCH(OH)R' \quad (III)$$

wherein R, $a$, $b$ and R' are as defined heretofore and Z is oxygen or sulfur. If the reaction product is a thioether, it can be oxidized, for example with t-butyl hydroperoxide in methanol, to form the corresponding sulfoxide. It is also possible to react either a long-chain diol or a monoalkyl ether of glycerol with one molar proportion of ethylene oxide. By this process however, a mixture of products is obtained containing large proportions of unreacted starting diol or ether, with some mono-ethoxylated compound with which this invention is concerned, and with some poly-ethoxylated compounds such as those represented by the formula $RCH(OH)CH_2O(CH_2CH_2O)_xH$ wherein $x$ is greater than 1.

If a long-chain epoxyalkane is a reactant, it may be obtained by any suitable method. For example, an alkene may be oxidized directly in the presence of a catalyst or a chlorhydrin may be reacted with sodium hydroxide. Similarly, if a long-chain diol is a reactant, it may be obtained by any suitable method, such as the oxidation and hydration of olefins and the hydrolysis of chlorhydrins.

The following short-chain polyhydroxy reactants among others are within the scope of the above structure I:

SHORT-CHAIN POLYHYDROXY REACTANT (STRUCTURE III)

| a | R' | Z | Name | Structure |
|---|----|---|------|-----------|
| 1 | H | O | Ethylene glycol | HOCH₂CH₂OH |
| 1 | CH₂OH | O | Glycerol | HOCH₂CH(OH)CH₂OH |
| 1 | CH₃ | O | 1,2-propanediol | HOCH₂CHOHCH₃ |
| 1 | H | S | 2-mercapto ethanol | HSCH₂CH₂OH |
| 1 | CH₂OH | S | 3-mercapto-1,2-propanediol | HSCH₂CH(OH)CH₂OH |
| 1 | CH₃ | S | 1-mercapto-2-propanol | HSCH₂CHOHCH₃ |
| 2 | H | O | 1,3-propanediol | HO—CH₂—CH₂—CH₂OH |
| 2 | CH₂OH | O | 1,2,4-butane triol | HOCH₂CH₂CH(OH)CH₂OH |
| 2 | CH₃ | O | 1,3-butylene glycol | HOCH₂CH₂CH(OH)CH₃ |
| 2 | H | S | 3-mercapto-1-propanol | HSCH₂CH₂CH₂OH |
| 2 | CH₂OH | S | 4-mercapto-1,2-butanediol | HSCH₂CH₂CH(OH)CH₂OH |
| 2 | CH₃ | S | 4-mercapto-2-butanol | HSCH₂CH₂CH(OH)CH₃ |

These new nonionic detergents have the following generic structure:

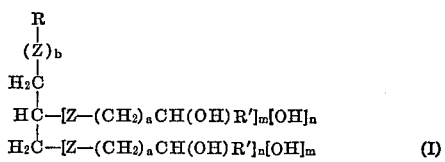

wherein R is an aliphatic hydrocarbon group having 5–12 carbon atoms; each Z is oxygen, sulfur or sulfoxide; $a$ is 1 or 2; $b$ is 0 or 1; $m$ is 0 or 1; $n$ is 0 or 1; $m+n$ is 1; and R' is H, CH₂OH or CH₃. As used herein, this structure is intended to include isomeric compounds.

Any known method may be employed to prepare the aforementioned polyolethers and polypolyethers and sulfur analogs thereof. However, the preferred method is to react a long chain epoxide or long chain glycidyl ether with a polyhydroxy compound, such as, ethylene glycol or glycerol, in the presence of an acid catalyst, e.g., SnCl₄, or a basic catalyst, e.g., NaOCH₃. The reaction can also be carried out without a catalyst, but in such cases, longer reaction times are required. In accordance with this Preferred compounds in this invention among others include polyolethers, such as 2-hydroxydodecyl 2'-hydroxyethyl ether having the structure:

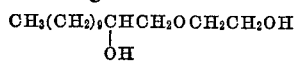

and 2-hydroxydodecyl glyceryl ether having the structure:

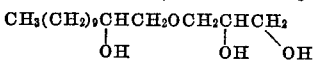

and polyolpolyethers, such as α-decyl-α'-hydroxyethyl glyceryl diether having the structure:

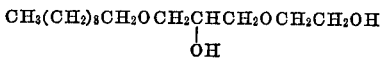

The compounds of the present invention may be used alone as detergents. However, the compounds of the invention may also be used in combination with other detergents. Examples of detergent compounds with which the compounds of the invention may be admixed to form superior combinations are the well-known anionic types represented by the water-soluble and water-dispersible organic surface-active agents having in the molecule a hydrophobic group of about 8 to about 22 carbon atoms and a hydrophilic sulfate, sulfonate or carboxylic group having a cation which does not insolubilize the compound. The following anionic detergents among others are suitable for use with the compounds of the present invention:

(1) Alkylbenzenesulfonates, such as the sodium and potassium salts having a branched or straight chain alkyl portion of about 9 to about 15 carbon atoms.

(2) Alkyl sulfates, such as the sodium and triethanolammonium salts of $C_{10}$–$C_{20}$ alkyl sulfuric acid, prepared by sulfating the alcohols derived from coconut oil or tallow, or prepared synthetically.

(3) The alkali metal and ammonium salts of the sulfated ethoxylates of a long-chain alcohol and 3 to 5 molar proportions of ethylene oxide, for example the ammonium salt of an ethoxylate containing an average of 3.1 molar proportions of ethylene oxide and 1 mole of an alcohol mixture known commercially as Alfol 1412, composed of about ⅔ n-tetradecanol and about ⅓ n-dodecanol.

(4) The compounds known as "Medialans," which are amido carboxylic acids formed by condensing fatty acids of $C_8$–$C_{22}$ chain length with sarcosine, $CH_3NHCH_2COOH$. Generally the alkali metal and basic nitrogen-radical salts are employed.

(5) Alkanesulfonates, such as ammonium dodecanesulfonate.

(6) Alkoxyhydroxypropanesulfonates, such as the water-soluble salts of 3-dodecyloxy-2-hydroxy-1-propanesulfonate.

(7) Soaps, the surface-active substances formed usually by the reaction of caustic alkalies with natural glyceridic fats and oils, generally prepared in high purity, and having the generic molecular formula RCOONa, wherein R is a straight-chain hydrocarbon group having from about 8 to about 22 carbon atoms.

The compounds of the invention are also suds-boosters for nonionic detergents. The following nonionic detergents among others are suitable for use with the compounds of the present invention.

(1) The Pluronics, formed by condensing propylene oxide with propylene glycol to a molecular weight of about 600–2500 to form a base followed by condensing ethylene oxide to this base to the extent of about 10% to about 90%, total molecule basis. U.S. Pat. Nos. 2,674,619 and 2,677,700 describe operable nonionic compounds.

(2) Compounds formed by the simultaneous polymerization of propylene oxide and ethylene oxide, and containing randomly positioned oxypropylene and oxyethylene groups. These and related compounds are described in U.S. Pats. Nos. 2,979,528, 3,036,118, 3,022,335, 3,036,130 and 3,048,548.

(3) Alkyl phenols having 9–12 carbon atoms in the alkyl portion (straight or branched) ethoxylated with 4–10 molar proportions of ethylene oxide.

(4) Ethoxylates of fatty alcohols having 8–18 carbon atoms per molecule and 5 to 30 molar proportions of oxyethylene groups.

The compounds of this invention may interact synergistically with all suds-producing anionic and nonionic surface-active substances to provide mixtures having improved properties beyond those expected on the basis of the properties of the individual components of the mixture. With nonsoaps, the synergism may be evident in suds production or stability. With soaps, the synergism may be evident in the form of reduced lime-scum formation.

Thus, in accordance with this invention, new compounds have been formed. The compounds of the present invention have certain noteworthy features. For example, the synergistic suds-producing properties of the compounds with other detergents and sudsing agents are surprising. The antimicrobial properties of the compounds are also surprising. Furthermore, the compounds of the invention are nonionic surfactants with foaming characteristics superior to both well-known anionic and nonionic detergents. The ability to formulate a detergent based on the nonionic materials of the invention having high foaming or dishwashing characteristics with built-in germicidal properties and which at the same time is biodegradable by sewage or natural water bacteria is certainly surprising and unexpected.

The following examples are submitted to illustrate but not to limit this invention. Unless otherwise indicated, all parts and percentages in the specification and claims are based upon weight.

EXAMPLE I

A compound, 2-hydroxy-$C_{11-15}$ alkyl glyceryl ether, was prepared by adding 286 g. (1.3 moles) of 1,2-epoxy-$C_{11-15}$ alkane (purity, 89%) dropwise over 30 minutes with stirring at 120°–137° C. to 2401 g. (26 moles) of glycerol containing 2.3 g. of stannic chloride. Heating was continued for one hour. The upper layer was removed and an additional 286 g. of epoxide was added to the lower, glycerol, layer at 133°–138° and heating continued for one hour. The first product layer was then returned to the pot and the combined layers neutralized with 5 g. of sodium carbonate. The layers were then separated, and from the top layer olefin, unreacted epoxide, and excess glycerol were removed by distillation at 0.9 mm. Distillation of the 691 g. residue in a molecular still gave 488 g. (1.67 moles) of distilled product.

A compound, 2-hydroxydodecyl 2'-hydroxyethyl ether, was prepared as follows. A solution of 1 ml. stannic chloride in 434 g. (7.0 moles) ethylene glycol was stirred at 135°–150° C. while 129 g. (0.63 mol; 90% purity) 1,2-epoxydodecane were added dropwise over a thirty minute period. The solution was held at about 140° C. for an additional hour after which a solution of 8 g. sodium carbonate in 32 g. water was added to neutralize the catalyst. The reaction product therefrom was stripped of excess ethylene glycol (up to 109° C. at 16 mm.). The crude product remaining was filtered and distilled subsequently at reduced pressure.

These two compounds and one prior art compound were tested for detergency by means of a Terg-O-Tometer Detergency Test. This test gives an empirical measurement of the amount of soil removed from fabric under simulated washing conditions. Stated sizes of cotton cloth, soiled in a standard manner with a standard soil, i.e., vacuum cleaner dust, are placed in a miniature washing machine, and they are laundered in the presence of a measured amount of detergent and water of a standard hardness. A Terg-O-Tometer apparatus is described in the Journal of the American Oil Chemists' Society, vol. 27, pages 153–159, May 1950. After rinsing and drying, the reflectance of the cloths is measured and compared with the reflectance of the soiled cloths before washing.

In the detergency tests referred to herein, the Terg-O-Tometer apparatus was maintained in a water bath adjusted to maintain the temperature of the washing solution at 120° F.±2° F. The paddle oscillation was brought to ninety complete cycles per minute, and the paddle oscillated through a 320° arc.

With agitators in position on the machine, the detergent was added in the desired amount to the washpot of the machine. Subsequently, 1250 ml. of water, having a hardness of 180 parts per million as $CaCO_3$ (60 parts magnesium and 120 parts calcium calculated as calcium carbonate), were added. The machine was started and the solution agitated until the detergent was dissolved. Four pieces of soiled cloth heretofore described approximately 4½ inches x 6 inches were then added and washing was continued for twenty minutes, after which the test swatches were removed from the solution and hand-squeezed. The washpot was refilled with clear rinse water of the same hardness used for washing at a temperature of 120° F., ±2° F., and, with the agitators running, the cloths were rinsed for five minutes. The cloths were then removed, hand-squeezed and ironed dry. The detergency units were determined by recording the differences in reflectance readings for washed and unwashed soiled cloths. Table 1 indicates the results of the Terg-O-Tometer tests.

TABLE 1

| Compound:[1] | Detergency units |
|---|---|
| 2-hydroxy-$C_{11}$–$C_{15}$ alkyl glyceryl ether | 8.5 |
| 2-hydroxydodecyl 2'-hydroxyethyl ether | 8.2 |
| Sodium mixed $C_{12}$–$C_{15}$ alkylbenzene sulfonate[2] | 6.9 |

[1] 0.025% compound and 0.05% tetrapotassium pyrophosphate (TKPP).
[2] Derived from tetra- and penta-propylene.

This example shows that the compounds of this invention in built formulations have superior detergency as compared with a prior art compound used in household detergent formulations.

EXAMPLE II

A compound, 2-hydroxydodecyl alkyl glyceryl ether, was prepared by adding 160 g. (0.87 mol) 1,2-epoxydodecane dropwise over 50 minutes with stirring at 125° C. to 400 grams (4.35 moles) glycerol (synthetic grade, min. 99.5%) containing 1.7 g. stannic chloride. Shortly after addition had started, the solution became cloudy and two phases developed subsequently. The solution was stirred two additional hours. The catalyst was then neutralized by the addition of 4 g. sodium bicarbonate in 200 ml. water and the product was taken up in water and ether. The ether layer was washed and dried, and the solvent was removed therefrom followed by vacuum distillation.

The dishwashing properties of this compound and the compound, 2-hydroxydodecyl 2'-hydroxyethyl ether of Example I, were compared with three prior art compounds by determining the number of plates washed with 1.5 g. of each compound in 6 quarts of 120 p.p.m. water at 116° F. The results are shown in Table 2.

TABLE 2

| Compound: | Number of plates washed |
|---|---|
| 2-hydroxydodecyl glyceryl ether | 31 |
| 2-hydroxydodecyl 2'-hydroxyethyl ether | 28 |
| Dodecylphenol-10 ethylene oxide[1] | 5 |
| Sodium dodecylbenzene sulfonate[2] | 17 |
| Sodium lauryl sulfate | 5 |

[1] Dodecyl chain is derived from propylene tetramer; ethylene oxide chain averages 10 units in length;
$C_{12}H_{25}\phi O(CH_2CH_2O)_{10}H$

[2] Dodecyl chain is derived from propylene tetramer.

It is evident from this example that the reaction products of 1,2-epoxydodecane have greatly superior dishwashing properties in relation to the standard detergents.

EXAMPLE III

Two ethylene glycol ethers were formed as described in Example I with the appropriate 1,2-epoxyalkane reactant being employed. The dishwashing properties of the two ethers were compared by determining the number of plates washed with 1.8 g. of each ether boosted with 0.49 g. coconut monoethanolamide (CMEA) in 6 quarts of 120 p.p.m. water at 116° F. The results are shown in Table 3.

TABLE 3

| Compound: | Number of plates washed |
|---|---|
| 2-hydroxydecyl 2'-hydroxyethyl ether | 25 |
| 2-hydroxydodecyl 2'-hydroxyethyl ether | 33 |

This example demonstrates that compounds of the invention have excellent dishwashing properties.

EXAMPLE IV

The dishwashing properties of the ethylene glycol ether of Example I with (Formulation A) and without (Formulation B) a booster were measured by determining the number of dishes washed with 6 g. of each formulation in 6 quarts of 120 p.p.m. water at 116° F. Table 4 has the results.

TABLE 4

| Ingredients | Formulation (parts by wt.) | |
|---|---|---|
| | A | B |
| 2-hydroxydodecyl 2'-hydroxyethyl ether | 30 | 30 |
| Coconut monoethanolamide | | 8 |
| Number of Dishes Washed | 32 | 41 |

From this example, it is manifest that compounds within the scope of the invention have excellent dishwashing properties alone or in combination with a booster.

EXAMPLE V

The compound, α-decyl-α'-hydroxyethyl glyceryl diether, was prepared by the addition of 35 g. (0.16 mole) decyl glycidyl ether to 40 g. (0.65 mole) ethylene glycol containing 0.2 ml. of stannic chloride at 125° C. over 0.5 hour. The solution was stirred an additional hour at 135° C. Sodium carbonate was added to destroy the catalyst, excess glycol was stripped off, and the residue was distilled.

The ethylene glycol ether of Example I was prepared and a similar ethylene glycol ether was also prepared except that one of the reactants was 1,2-epoxy-$C_{11}$–$C_{15}$ alkane.

These three compounds were tested as suds-boosters for other detergent actives indicated in Table 5. The number of dishes washed for each of the various formulations was determined as described in Example IV. The results are also indicated in Table 5.

TABLE 5

| Ingredients | Formulation (parts by wt.) | | | | | | | | | | | | |
|---|---|---|---|---|---|---|---|---|---|---|---|---|---|
| | A | B | C | D | E | F | G | H | I | J | K | L | M |
| Ammonium Alfol 1412-3.1 EO sulfate[1] | 30 | | | 30 | 30 | | | | | | | | |
| Linear alkylate sulfonate[2] | | | | | | 30 | | | 30 | 30 | | | |
| Sodium lauryl sulfate[3] | | | | | | | | | | | 30 | | 30 |
| 2-hydroxy $C_{11-15}$ alkyl 2'-hydroxyethyl ether | | 9 | | 9 | | | 9 | | | 9 | | | |
| 2-hydroxydodecyl 2'-hydroxyethyl ether | | | | | | | | | | | | 9 | 9 |
| α-Decyl-α'-hydroxyethyl glyceryl diether | | | 9 | | 9 | | | 9 | | | 9 | | |
| Number of Dishes Washed | 23 | 8 | 3 | 35 | 32 | 28 | 8 | 3 | 42 | 45 | 17 | 10 | 39 |

[1] Ammonium salt of a sulfated reaction product of 3.1 molar proportions of ethylene oxide and 1 mole of a mixture of long chain primary alcohols of which about ⅔ has 14 carbon atoms and about ⅓ has 12 carbon atoms in the hydrocarbon chain.
[2] Sodium alkylbenzenesulfonate in which the alkyl portion is a linear hydrocarbon chain composed of a mixture of chain lengths of about 11 to about 14 carbon atoms (LAS).
[3] Sodium salt of sulfated primary alcohols derived from coconut oil.

It is manifest from the above that the compounds of the present invention are good suds-boosters and have a synergistic effect. This is shown by the 35 dishes washed with Formulation D whereas 31 total dishes were washed by Formulations A and B, by the 32 dishes washed with Formulation E whereas 26 total dishes were washed by Formulations A and C, by the 42 dishes washed with Formulation I whereas 36 total dishes were washed by Formulations F and G, by the 45 dishes washed with Formulation J whereas 31 total dishes were washed by Formulations F and H and by the 39 dishes washed with Formulation M whereas 27 total dishes were washed by Formulations K and L. Duplicate controls, which were a commercial liquid dishwashing detergent, were run, and 33 and 36 dishes were washed with the two controls.

EXAMPLE VI

The procedure of Example V was repeated with the formulations shown in Table 6.

The results in Table 6 demonstrate that compounds within the purview of the invention are good dishwashing detergents by themselves and are good suds-boosters for other detergent actives. Three runs were made with a commercial liquid dishwashing detergent as a control, and 35, 35 and 38 dishes were washed.

propriate 1,2-epoxyalkane reactant was used and the appropriate glycol or glycerol reactant was used.

The lime-soap scum dispersion test consists of agitating 35 cc. of a 1% (soap plus agent) solution at 45° C. in a Waring Blendor for one minute at 8,500 r.p.m. After 30 seconds the lather is quenched with 750 cc. of 180 p.p.m. (2 Ca–1 Mg) water at 40° C. The mixture is then stirred for 90 seconds with a mechanical stirrer after which the system is rated for foam. It is finally filtered over a black cloth and the reflectance is read on the Hunter Reflectometer.

TABLE 6

| Ingredients | Formulation (parts by wt.) | | | | | | | | |
|---|---|---|---|---|---|---|---|---|---|
| | A | B | C | D | E | F | G | H | I |
| Ammonium dodecylbenzene sulfonate of Example II | 17 | 17 | 17 | | | | | | |
| Ammonium Alfol 1412-3.1 EO sulfate of Example V | | | | 25 | 25 | 25 | 25 | 25 | |
| 2-hydroxydodecyl glyceryl ether of Example II | 10 | | 25 | 10 | | | | | |
| 2-hydroxytetradecyl glyceryl ether [1] | | 10 | | | 10 | | | | |
| 2-hydroxy $C_{11-15}$ alkyl glyceryl ether of Example I | | | | | | 10 | | | |
| 2-hydroxydodecyl 2'-hydroxyethyl ether of Example I | | | | | | | 10 | | |
| 2-hydroxy $C_{11-15}$ alkyl 2'-hydroxyethyl ether | | | | | | | | 10 | |
| Number of Dishes Washed | 14 | 35 | 32 | 35 | 38 | 25 | 33 | 36 | 35 |

[1] Prepared in the same manner as the glyceryl ether of Example II except that 1,2-ethoxytetradecane was the reactant.

EXAMPLE VII

Formulation A was provided with the following ingredients therein:

TABLE 7

| Ingredients: | Percent |
|---|---|
| Ammonium lauryl sulfate | 13.2 |
| 2-hydroxy-$C_{11}$-$C_{15}$ alkyl 2'-hydroxyethyl ether | 4.0 |
| Oleic isopropanolamide | 1.0 |
| Perfume | 0.7 |
| Water (balance to 100%). | |

Formulation A was found to be a good shampoo. The lathering, ease of wet and dry combing of the hair and hair conditioning were similar to a standard shampoo formulation having the same components as Formulation A except that the ether was replaced with capric diethanolamide.

EXAMPLE VIII

Lime-soap dispersant properties were determined for the following compounds:

| Compound | Structure |
|---|---|
| A | $C_{12}H_{25}$—CHCH$_2$OCH$_2$CHCH$_2$OH<br>　　　　　OH　　　　　OH |
| B | $C_{10}H_{21}$—CHCH$_2$OCH$_2$CH$_2$<br>　　　　　OH　　　　　OH |
| C | $C_{12}H_{25}$—CHCH$_2$OCH$_2$CH$_2$<br>　　　　　OH　　　　　OH |
| D | $C_{12}H_{25}$—CHCH$_2$OCH$_2$CH$_2$CH$_2$<br>　　　　　OH　　　　　OH |
| Control | $C_{12}H_{25}$OCH$_2$CHCH$_2$OH<br>　　　　　OH |

Compounds A, B, C and D were prepared in the same manner as the ethers of Example I except that the appropriate 1,2-epoxyalkane reactant was used and the appropriate glycol or glycerol reactant was used.

The properties of each of the above compounds are shown in Table 8.

TABLE 8

| Compound: | Percent Compound [1] | Foam [4] | Reflectance Increase [5] |
|---|---|---|---|
| A | 20 | [2] 4.0 | [3] 0.7 |
| A | 15 | 2.5 | 0.7 |
| B | 20 | 2.5 | 1.1 |
| C | 20 | 4.0 | 1.3 |
| D | 20 | 2.5 | 0.7 |
| Control | 20 | 4.0 | 3.7 |

[1] Percent compound=g. compound/(g. compound+g. soap)×100- concentration (compound+soap)=1%; soap is 80:20 sodium tallow; coconut soap used in the form of 87% soap, 13% water soap chips.
[2] Ratings: 0=Poor; 2=Fair; 4=Good.
[3] Ratings:≤1.5 good.
[4] Visual observation and rating.
[5] Difference between reflectometer readings on unwashed and washed cloth. The less the difference, the greater is the effectiveness of the agent This example demonstrates that the compounds of the invention are effective lime-soap dispersants.

EXAMPLE IX

By varying the 1,2-epoxyalkane and the appropriate glycol or glycerol (triol) reactant, Compounds A, B, C, D and E were formed as described in Example I. These compounds are as follows:

| Compound | Structure |
|---|---|
| A | $C_{10}H_{21}$—CHCH$_2$OCH$_2$CHCH$_2$OH<br>　　　　　OH　　　　　OH |
| B | $C_{9-13}H_{19-27}$—CHCH$_2$OCH$_2$CHCH$_2$OH<br>　　　　　OH　　　　　OH |
| C | $C_{12}H_{25}$—CHCH$_2$OCH$_2$CHCH$_3$<br>　　　　　OH　　　　　OH |
| D | $C_{10}H_{21}$—CHCH$_2$OCH$_2$CH$_2$CH$_2$<br>　　　　　OH　　　　　OH |
| E | $C_{12}H_{25}$—CHCH$_2$OCH$_2$CH$_2$CHCH$_3$<br>　　　　　OH　　　　　OH |

Table 9 records the reflectance increase which was determined as in Example VIII for each of the aforementioned compounds.

TABLE 9

| Compound: [1] | Reflectance increase |
|---|---|
| A | 0.7 |
| B | 0.4 |
| C | 0.5 |
| D | 0.4 |
| E | 0.6 |
| Control of Example VIII | 3.7 |

[1] 20% as defined in Example VIII.

It is evident that with respect to reflectance increase, Compounds A, B, C, D and E are superior to lauryl glyceryl ether, the control.

EXAMPLE X

Riber water biodegradation tests were run for certain compounds within the scope of the invention and for certain previously known anionic and nonionic detergents. The results are indicated in Table 10.

In this test, a new one-half gallon mason jar with metal insert screw cap is rinsed with distilled water and 980 ml. of freshly-sampled river water is poured into the jar. Twenty mg. of the test active is then added (as 20 ml. of a 1000 p.p.m. stock solution), resulting in a 20 mg./l. or 20 p.p.m. solution. A magnetic bar is immediately placed in the jar and the solution stirred for one minute and sampled while the solution is still being stirred. The magnetic bar is then removed and the top screwed on the jar. The jar remains quiescent at normal room temperature until the next sampling. Sampling continues periodically for the duration of the test. As many test actives as desired, or as can be handled, may be run with the same basic river water; each test active requires a separate jar. At each sampling, 25 ml. are transferred to a 50 ml. graduated cylinder, shaken, and the foam "height" read in ml.

In view of Table 10, it is manifest that 2-hydroxydodecyl 2'-hydroxyethyl ether and 2-hydroxydodecyl glyceryl ether have excellent biodegradability since they lost all surface activity in 3 or 4 days. Conversely, the previously known nonionic detergents were still foaming after the fourth day. The dodecene-1 derived straight chain alkylbenzenesulfonate, a previously known biodegradable detergent, foamed less initially than the compounds of the invention, but showed no signs of degradation until the fourth day, in contrast to the compounds of the invention, which exhibited considerable degradation on the second day.

TABLE 10

| Compound | Foam Heights in ml./25 ml. solution (Days) [2] | | | | |
|---|---|---|---|---|---|
| | 0 | 1 | 2 | 3 | 4 |
| 2-hydroxydodecyl 2'-hydroxyethyl ether [1] | 3½ | 3 | 1½ | 0 | ---- |
| 2-hydroxydodecyl glyceryl ether [1] | 3½ | 3½ | 2 | 1 | 0 |
| $C_{14}$-$C_{18}$ straight chain alcohol, 60% ethylene oxide adduct | 2½ | 2½ | 2 | 2 | ½ |
| Branched chain dodecylphenol-10 moles ethylene oxide adduct | 2½ | 3 | 2½ | 3 | 4 |
| Dodecene-1 derived straight chain alkylbenzenesulfonate | 2 | 2½ | 3 | 2½ | 0 |

[1] As in Example I.
[2] River Water Die Away Tests.

EXAMPLE XI

Toxicity and mildness properties were determined for compounds of the invention. The tests and the results of the tests are listed in Table 11.

Table 11 shows that no rat deaths resulted with 2-hydroxytetradecyl glyceryl ether in the Acute Oral Toxicity Test and that two ethers of the invention were mild towards the skin in the RAP Mildness Test. Table 11 also shows that a shampoo formulation containing 2-hydroxydodecyl glyceryl ether was only moderately irritating in the Draize Rabbit Experiment Irritation Test and it would meet FDA corneal irritation requirements. Therefore, the compounds within the scope of the present invention have suitable toxicity and mildness properties.

EXAMPLE XII

The germicidal activity of compounds described in this invention were determined by the Streak Gradient Plate Method.

The Streak Gradient Plate Method is a modification of the gradient plate method of Szybalski, Science, 116: 46–48 (1952), for the determination of germicide MEC (Minimum Effective Concentration) values. This method employs streaks of several organisms per plate.

As demonstrated in Table 12, which indicates the determinations, certain compounds of the invention have surprisingly high antimicrobial activity and they are superior to soap, a commonly used synthetic detergent, a well-known antifungal agent and a well-known germicide against a number of microorganisms.

TABLE 11.—ACUTE ORAL TOXICITY TEST [1]

| Compound | $LD_{50}$ (10 rats) | Death |
|---|---|---|
| 2-hydroxytetradecyl glyceryl ether | >5.0 g./kg | None. |

RAP MILDNESS TEST [2]

| Formulation | Mildness Rating [3] |
|---|---|
| 1. 30% 2-hydroxydodecyl glyceryl ether in ethylene glycol | 0–1 |
| 2. 30% 2-hydroxy $C_{11-15}$-alkyl 2'-hydroxyethyl ether in ethanol | 0–1 |
| 3. 30% ammonium Alfol 1412-3.1 EO sulfate in ethanol-water | 0–1 |
| 4. 30% ammonium linear $C_{10}$-$C_{14}$ alkylbenzene-sulfonate | 3 |

DRAIZE RABBIT EYE IRRITATION TEST [4]

| Ingredient | Liquid Shampoo (percent) |
|---|---|
| 2-hydroxydodecyl glyceryl ether | 25.0 |
| Perfume | 0.1 |
| Water (balance to 100%) | |

[1] Method given in Appraisal of the Safety of Chemicals in Foods, Drugs and Cosmetics by the staff of the Division of Pharmacology of the Food and Drug Administration, Department of Health, Education and Welfare (1959).
[2] Method described by Justice, Travers and Vinson, Proceedings of the Scientific Section of The Toilet Goods Association, Number 35, May 1961.
[3] Mildness Ratings with test level being 8% of formulation.
 0=No epidermal erosion (very mild).
 1=Small areas of erosion (fair mildness).
 2=25% to 50% epidermal erosion (moderately irritating).
 3=Greater than 50% erosion (strongly irritating).
[4] Draize, J. H. Appraisal of the Safety of Chemicals in Foods, Drugs and Cosmetics, 1959. Six male albino rabbits were used to test the experimental shampoo. Each of the six animals received 0.1 ml. of the full strength solution in the left eye. No rinse was used; the untreated eye served as a control. After 3 days, only one rabbit showed moderate corneal damage which persisted after the 7 day gross observation.

TABLE 12.—GERMICIDAL ACTIVITY BY STREAK GRADIENT PLATE METHOD

| Compound | Minimum Effective Concentration (MEC) in p.p.m. | |
|---|---|---|
| | C. albicans (yeast) | Chaet. globosum (mold) |
| Test A: | | |
| 2-hydroxydodecyl glyceryl ether | 42 | 28 |
| Soap | 5,100 | 200 |
| Syndet [1] | 2,300 | 335 |
| Triacetin | 25,000 | 3,550 |

| | S. aureus | M. candidus | Str. faecalis | Cand. albicans | E. coli | Sal. choleraesuis |
|---|---|---|---|---|---|---|
| Test B: | | | | | | |
| 2-hydroxydodecyl glyceryl ether | 37.4 | 66.5 | 30.0 | 25.6 | >100 | >100 |
| Trichlorocarbanilide (TCC) | 0.15 | >100 | >100 | >100 | >100 | >100 |

| | C. albicans | A. niger |
|---|---|---|
| Test C: | | |
| 2-hydroxydodecyl 2'-hydroxyethyl ether | 38 | 36 |
| α-Decyl-α'-hydroxyethyl glyceryl diether | 100 | 72 |
| 2-hydroxydodecyl glyceryl ether | 52 | 56 |

[1] Commercial built detergent based on sodium mixed $C_{12}$-$C_{15}$ polypropylenebenzenesulfonate.

EXAMPLE XIII

Compound A, 2-hydroxydodecyl 2'-hydroxyethyl thioether, was prepared by stirring a mixture of 25.3 g. (0.324 mol) 2-mercaptoethanol and 5.4 g. (0.1 mol) sodium methoxide under nitrogen while adding dropwise 59.6 g. (0.324 mol) 1,2-epoxydodecane over a period of 25 minutes. After continued stirring on a steam bath for 85 minutes, the crude material was dissolved in hexane. A portion therefrom was washed with water in the presence of methanol to remove catalyst and another portion was merely filtered.

Compound B, 2-hydroxy-$C_{11}$–$C_{14}$ alkyl 2'-hydroxyethyl thioether, was prepared in a same manner except that 1,2-epoxy $C_{11}$–$C_{14}$ alkane was one of the reactants.

Compound C, a sulfoxide compound was formed by oxidizing 2-hydroxydodecyl 2'-hydroxyethyl thioether with t-butyl hydroperoxide in methanol.

The dishwashing properties were determined by determining the number of plates washed in duplicate tests with 1.8 g. of each of the above compounds in 6 quarts of 120 p.p.m. water at 116° F. both with or without 0.54 g. of coconut fatty acid monoethanolamide (CMEA). The results are shown in Table 13.

TABLE 13

| Compound: | Boosted with CMEA | Number of Dishes Washed |
|---|---|---|
| A | No | 20–24 |
| B | No | 12–20 |
| A | Yes | 38–42 |
| B | Yes | 42 |
| C | Yes | 42 |

This example shows that the thioethers and the corresponding sulfoxides within the purview of the present invention have excellent dishwashing properties.

Having set forth the general nature and specific embodiments of the present invention, the true scope is now particularly pointed out in the appended claims.

What is claimed is:

1. A composition consisting essentially of a surface active agent selected from the group consisting of an alkylbenzenesulfonate in which the alkyl group has 9 to 15 carbon atoms, an alkyl sulfate in which the alkyl group has 9 to 15 carbon atoms, an alkali metal or ammonium salt of the sulfated ethoxylates of a long chain alcohol and 3 to 5 molar proportions of ethylene oxide, amido carboxylic acids formed by condensing fatty acids of $C_8$–$C_{22}$ chain length with sarcosine, an alkanesulfonate, an alkoxyhydroxypropane sulfonate, a soap, propylene oxide condensed with propylene glycol to a molecular weight of about 600–2500 further condensed with 10–90% ethylene oxide, simultaneously polymerized propylene oxide and ethylene oxide containing oxypropylene and oxyethylene groups, an alkyl phenol ethoxylated with 4–10 molar proportions of ethylene oxide and an ethoxylate of a $C_8$–$C_{18}$ fatty alcohol and 5–30 molar proportions of oxyethylene groups and a detergent having the structure:

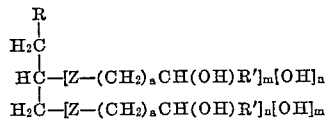

wherein R is an aliphatic saturated hydrocarbon group having 5–12 carbon atoms; Z is oxygen, sulfur or sulfoxide; $a$ is 1 or 2; $m$ is 0 or 1; $n$ is 0 or 1; $m+n$ all occurrences is 1; and R' is $CH_2OH$ or $CH_3$.

2. A composition consisting essentially of a surface active agent selected from the group consisting of an alkylbenzenesulfonate in which the alkyl group has 9 to 15 carbon atoms, an alkyl sulfate in which the alkyl group has 9 to 15 carbon atoms, an alkali metal or ammonium salt of the sulfated ethoxylates of a long chain alcohol and 3 to 5 molar proportions of ethylene oxide, amido carboxylic acids formed by condensing fatty acids of $C_8$–$C_{22}$ chain length with sarcosine, an alkanesulfonate, an alkoxyhydroxypropane sulfonate, a soap, propylene oxide condensed with propylene glycol to a molecular weight of about 600–2500 further condensed with 10–90% ethylene oxide, simultaneously polymerized propylene oxide and ethylene oxide containing oxypropylene and oxyethylene groups, an alkyl phenol ethoxylated with 4–10 molar proportions of ethylene oxide and an ethoxylate of a $C_8$–$C_{18}$ fatty alcohol and 5–30 molar proportions of oxyethylene groups and a detergent having the structure:

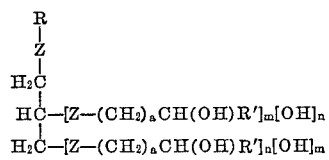

wherein R is an aliphatic saturated hydrocarbon group having 5–12 carbon atoms; Z is oxygen, sulfur or sulfoxide; $a$ is 1 or 2; $m$ is 0 or 1; $n$ is 0 or 1; $m+n$ all occurrences is 1; and R' is H, $CH_2OH$ or $CH_3$.

3. A built detergent composition consisting essentially of 2-hydroxy-$C_{11}$–$C_{15}$ alkyl glyceryl ether as a detergent and tetrapotassium pyrophosphate as a builder.

4. A dishwasher composition consisting essentially of α-decyl-α'-hydroxyethyl glyceryl diether as a detergent and sodium alkylbenzenesulfonate in which the alkyl portion is linear $C_{11}$ to $C_{14}$ hydrocarbons as a surface active agent.

5. A dishwasher composition consisting essentially of 2-hydroxy-dodecyl glyceryl ether as a detergent and ammonium salt of a sulfated reaction product of 3.1 molar proportions of ethylene oxide and 1 mole of an alcohol mixture of about ⅔ n-tetradecanol and ⅓ n-dodecanol as a surface active agent.

6. A shampoo consisting essentially of 2-hydroxy-$C_{11}$–$C_{15}$ alkyl glyceryl ether as a detergent and ammonium lauryl sulfate as a surface active agent.

7. A composition with lime-soap dispersant properties consisting essentially of 2-hydroxytetradecyl glyceryl ether as a detergent and sodium tallow-coconut soap as a surface active agent.

References Cited
UNITED STATES PATENTS

| | | | |
|---|---|---|---|
| 2,768,956 | 10/1956 | Scott | 252—161 |
| 3,240,819 | 3/1966 | Gaertner et al. | 260—615 |
| 3,308,068 | 3/1967 | Jones | 252—161 |
| 3,350,460 | 10/1967 | Lamberti | 260—615 |

LEON D. ROSDOL, *Primary Examiner.*

P. E. WILLIS, *Assistant Examiner.*

U.S. Cl. X.R.

252—121, 135, 152, 161; 260—615